E. A. SENDKER.
AUTOMOBILE SIGNAL.
APPLICATION FILED DEC. 26, 1918.
1,338,703.
Patented May 4, 1920.
2 SHEETS—SHEET 1.
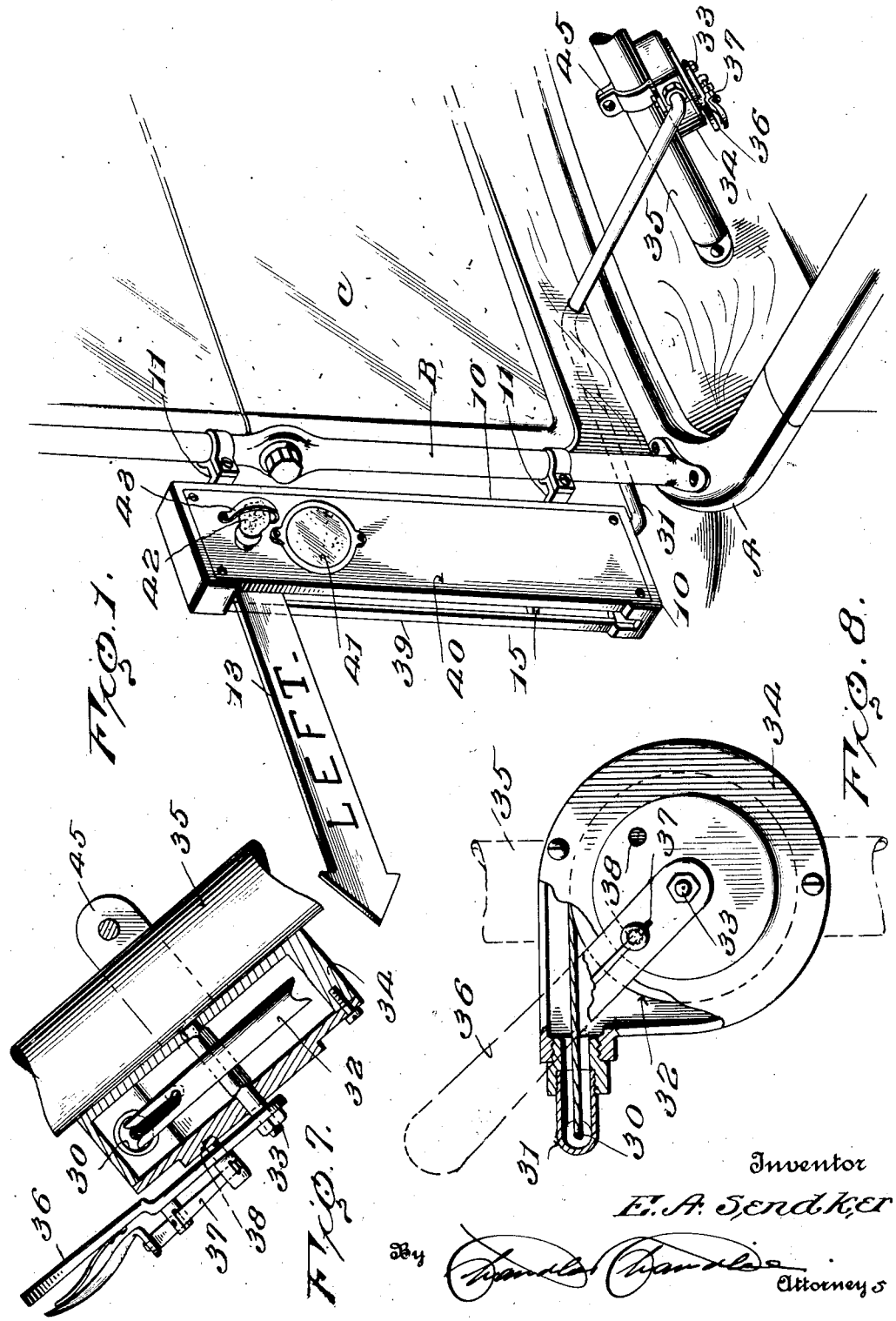

E. A. SENDKER.
AUTOMOBILE SIGNAL.
APPLICATION FILED DEC. 26, 1918.
1,338,703.
Patented May 4, 1920.
2 SHEETS—SHEET 2.
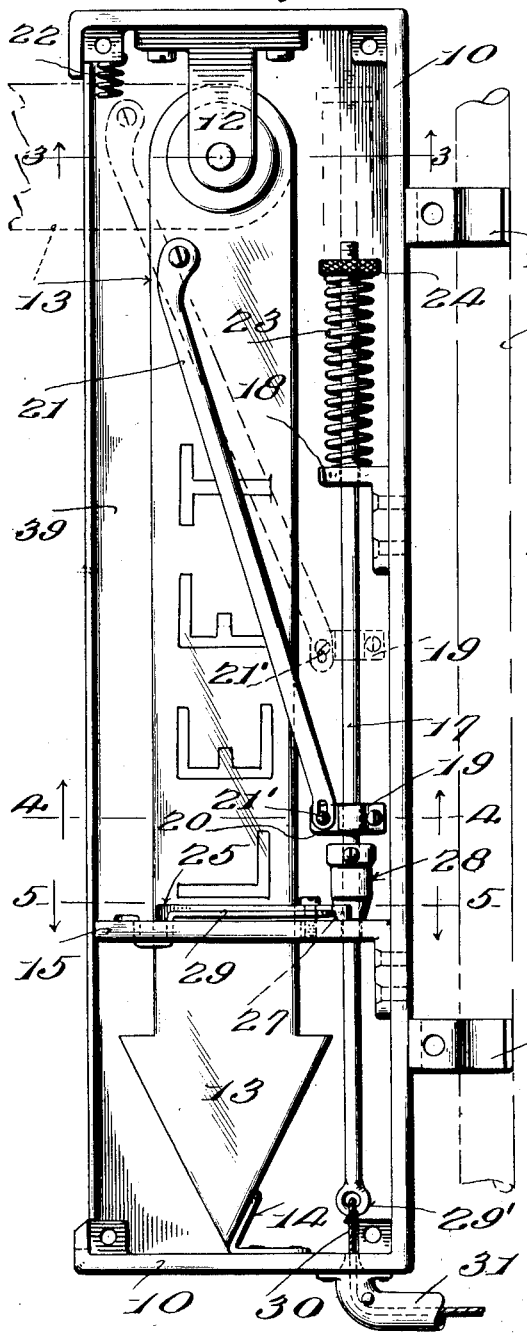
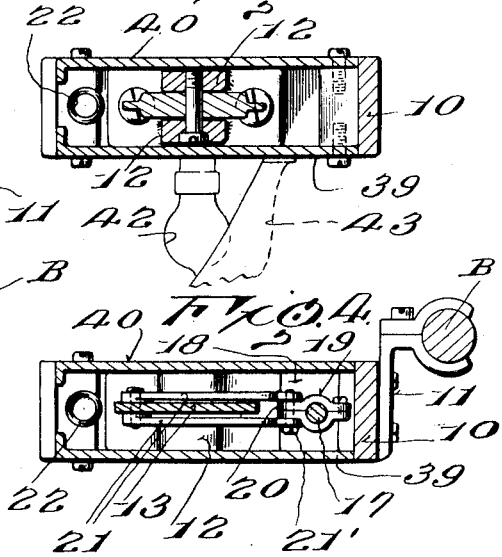
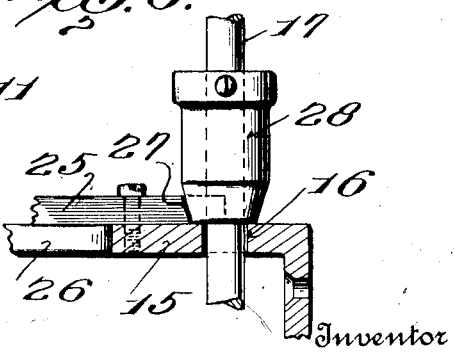

UNITED STATES PATENT OFFICE.

EDWARD A. SENDKER, OF BRADFORD, PENNSYLVANIA.

AUTOMOBILE-SIGNAL.

1,338,703.　　　　　Specification of Letters Patent.　　Patented May 4, 1920.

Application filed December 26, 1918. Serial No. 268,292.

*To all whom it may concern:*

Be it known that I, EDWARD A. SENDKER, a citizen of the United States, residing at Bradford, in the county of McKean, State of Pennsylvania, have invented certain new and useful Improvements in Automobile-Signals; and I do hereby declare the following to be a full, clear, and exact description of the invention, such as will enable others skilled in the art to which it appertains to make and use the same.

This invention relates to direction indicators for automobiles and it has for its object to provide a construction that may be readily attached to the wind shield of the vehicle and actuated from a hand lever attached to the steering post, to indicate the direction contemplated by the driver.

A further object of the invention is to provide means whereby the parts of the structure will be held securely against rattling without in any wise affecting the ease of their operation.

In the drawings forming a part of this specification and in which like characters of reference indicate similar parts in the several views:—

Figure 1 is a perspective view showing a portion of an automobile equipped with the present invention.

Fig. 2 is an elevation of the signaling device detached with the casing cover removed and the semaphore arm in lowered position.

Fig. 3 is a sectional view on the line 3—3 of Fig. 2.

Fig. 4 is a sectional view on the line 4—4 of Fig. 2.

Fig. 5 is a sectional view on the line 5—5 of Fig. 2.

Fig. 6 is an elevation of a portion of the shift rod and its plug with one of the jaws that holds the semaphore arm from rattling, the support for the jaws being partly in section.

Fig. 7 is a section taken vertically through the casing of the actuating drum, with its equipment and a portion of the steering column in elevation.

Fig. 8 is a face view of the subject-matter of Fig. 7, with a part of the casing broken away.

Referring now to the drawings, there is shown a portion of an automobile body A upon which is mounted a post B that supports the usual wind shield C, and it is to the post B, that the semaphore carrying casing is connected.

The semaphore carrying casing includes an open sided, rectangular frame 10, from one side of which project the clamps 11 that removably engage the post B and hold the casing thereto. From the upper end of the frame 10 there depends a bracket including ears 12, between which is pivoted one end of a semaphore arm 13, the lower end of which lies normally against a spring stop 14 at the bottom of the casing.

Transversely of the casing and in the lower portion of it, is a partition 15, at one end of which, adjacent the closed side of the frame 10, is a guide opening 16, in which is slidably mounted a shift rod 17, which has a bearing also in a bracket 18 thereabove, attached also to the closed side of the casing frame 10.

Upon the rod 17 is clamped a collar 19, which may be adjusted on the rod, and this collar has an ear 20 to which is pivoted the lower end of a pitman 21 having its upper end pivoted to the arm 13 near to its upper pivoted end. It will be noted that the rod 17 is between the semaphore arm and the inner or closed side of the casing frame 10, and that the point of pivotal connection of the pitman with the arm is at the opposite side of the central axis of the arm in which its pivot is located. Thus when the shift rod 17 is moved upwardly, the pitman is actuated to swing the semaphore arm into horizontal position, shown in Fig. 1 of the drawings. A helical spring 22 that depends from the top of the casing frame, is in the path of movement of the semaphore arm and is engaged thereby and compressed when the arm is raised as described and thus serves not only to cushion the arm, but by downward pressure thereagainst, to hold it from rattling.

The shift rod 17 is moved upwardly as described, through the medium of a helical spring 23 that encircles its upper end portion and rests with its lower end upon the bracket 18, while its upper end engages a thumb nut 24 that engages the threaded upper end of the rod 17 and through the medium of which the tension of the spring may be adjusted, as will be understood.

To hold the semaphore arm against lateral movement and consequent rattling when lowered through the medium of downward movement of the rod 17, clamping jaws 25 are pivoted upon the partition 15, at opposite sides of the longitudinal slot 26 therein, which opens to the open side of the casing frame 10 and in which the semaphore arm is received in its lowered position within the casing. The inner ends of the jaws 25 extend beyond their pivots and into close proximity to the rod 17, where they are concaved at their mutually adjacent corners and beveled with the resultant faces diverging upwardly, as shown at 27, so that these faces are conical sections. Upon the rod 17 is adjustably secured a tubular plug 28, the lower end portion of which is tapered to correspond to the faces 27 and when the rod 17 is lowered and the semaphore arm passes into the casing, this tapered end of the plug enters between the faces 27 and by forcing them apart, swings the opposite ends of the jaws into engagement with the semaphore arm, as shown in Fig. 5, thus to hold the arm from rattling.

Spring wires 29 engaged through the partition 15, rest with their free ends against the side faces of the rear end portions of the jaws 25 and hold them normally in close mutual relation.

To draw the shift rod 17 downwardly, there is attached to the eye 29' at the lower end of it, a flexible connection 30, which passes outwardly through the bottom of the casing frame 10 and thence through a direction tube 31 to a drum 32, fixed on a shaft 33 in a casing 34 having a clamp 45 for engagement with the steering column 35 of the automobile. The shaft 33 is provided exterior to the casing 34, with a handle 36 which carries a latch lever 37 for engagement with perforations 38 in the casing, interchangeably. When the handle is swung in one direction, the connection 30 is wound upon the drum to draw the rod 17 downwardly against the tension of the spring 23 and swing the semaphore arm into its casing and when the lever is moved in the opposite direction, the connection is unwound, when the spring 23 serves to raise the rod 17 and swing the semaphore arm to horizontal or indicating position.

The casing for the semaphore arm, includes not only the frame 10, but also the front and rear plates 39 and 40, secured to corresponding faces of the frame 10, the rear plate having secured thereto a mirror 41, above which is mounted an electric lamp 42, provided with a reflector 43 that serves to direct the light rays from the lamp onto the semaphore arm when the latter is in raised position.

The structure illustrated is for the left hand side of the vehicle and the semaphore is accordingly marked with the word "Left" and it will be understood that the entire structure may be duplicated at the opposite side of the vehicle with the semaphore arm correspondingly marked.

From the foregoing description it will be understood that when the semaphore arm is in lowered position, it lies within the slot 26 of the partition 15, where it is snugly embraced by the jaws 25 and held against rattling, while when raised, it is forced yieldably against the spring 22, and is again held from rattling.

It will be noted that the lower end of the pitman 21 is slotted to receive the pivot 21' that connects it to the ear 20 of the collar 19, so that the plug on the rod 17, may have initial upward lost motion with respect to the pitman. This initial motion, serves to carry the lower end of the plug from between the inner ends of the jaws 25, when the springs 29 swing them inwardly, thus carrying their outer ends away from and releasing the semaphore. Subsequent upward movement of the rod 17 actuates the pitman 21, as hereinbefore explained.

What is claimed is:—

1. A direction indicator comprising a pivoted semaphore arm, means for moving the arm to active position, normally inactive means for holding the arm retracted and means carried by the arm moving means for rendering active the holding means when said moving means is inactive.

2. A direction indicator comprising a movable signaling member, pivoted jaws disposed to hold the signaling member normally retracted, means for holding the signaling member to active position including an element having initial lost motion with respect thereto, and means carried by said moving means for holding the jaws in signal holding relation and operable by said initial lost motion of said elements for releasing the jaws and therewith the signal to permit of its movement to active position upon further movement of said elements.

3. A direction indicator comprising a movable signaling member, a shift rod, connection between the signaling member and the rod for moving said member to active position and with respect to which connection the rod has initial lost motion, means for holding the rod with the signaling member retracted, means for actuating the rod when it is released, supplemental means for holding the signaling member against vibration and means carried by the rod for rendering the signal-holding means active when the rod is held with the signal retracted.

4. A direction indicator comprising a swinging semaphore arm, a reciprocatory rod, a pitman connecting the semaphore arm and rod and with respect to which the rod has initial lost motion, means connected with the rod for holding it normally with the semaphore arm in retracted position, a spring carried by the rod for moving it to swing the semaphore arm to the opposite position when the rod is released, a pair of pivoted jaws disposed to embrace at one end the semaphore arm when retracted, means carried by the rod for engagement with the opposite ends of the jaws to engage the jaws with the semaphore arm when the rod is moved in a corresponding direction, and means for moving the jaws from embracing positions when the jaws are released.

5. A direction indicator comprising a pivoted semaphore arm, means for holding the arm normally retracted at one limit of its pivotal movement, means for holding the arm against vibration when retracted, a spring having connections with the arm to swing it to indicating position when the first named holding means is inactive, and a spring stop for limiting movement of the arm when released and against which it is adapted to be yieldably held under the influence of the first-named spring to hold it against vibration when in indicating position.

In testimony whereof I affix my signature in the presence of two witnesses.

EDWARD A. SENDKER.

Witnesses:
J. C. WILSON,
G. R. HARTE.